UNITED STATES PATENT OFFICE.

MYRTIL KAHN AND ANTON OSSENBECK, OF ELBERFELD, GERMANY, ASSIGNORS TO FARBENFABRIKEN VORM. FRIEDR. BAYER & CO., OF ELBERFELD, GERMANY, A CORPORATION OF GERMANY.

AZO DYE.

1,025,983.  Specification of Letters Patent.  Patented May 14, 1912.

No Drawing.  Application filed November 2, 1911. Serial No. 658,151.

*To all whom it may concern:*

Be it known that we, MYRTIL KAHN and ANTON OSSENBECK, doctors of philosophy, chemists, citizens of the German Empire, residing at Elberfeld, Germany, have invented new and useful Improvements in New Azo Dyes, of which the following is a specification.

Our invention relates to the manufacture and production of new tetrakisazo dyestuffs. The process for their production consists in combining with one molecule of a meta-diaminodiphenylurea compound such as meta-diaminodiphenylurea or ditolylurea two molecules of an intermediate compound obtained from one molecule of a tetrazo compound of a diamin, such as benzidin, tolidin, para-phenylenediamin and one molecule of a meta-aminophenol sulfonic acid. The new dyes are after being dried and pulverized dark powders yielding upon reduction with stannous chlorid and hydrochloric acid a diamin, triaminobenzene compounds, diaminophenol sulfonic acid and carbonic acid, dyeing cotton generally orange shades which on being diazotized and combined with meta-phenylenediamin turn into fast shades.

In order to illustrate the new process more fully the following example is given, the parts being by weight: 18.4 parts of benzidin are tetrazotized in the known manner with 14 parts of nitrite and the tetrazo compound is combined with a solution of 19 parts of meta-aminophenol sulfonic acid. To complete the formation of the intermediate product soda is slowly added to the mixture while it is being well stirred. The excess of soda is then neutralized and a solution of 17.5 parts of the hydrochlorid of meta-diaminodiphenylurea is added and sodium acetate until the mixture reacts neutral to Congo-paper. It is stirred for several hours at ordinary temperature and afterward for the same time at 50° C. care being taken to neutralize the acid which is liberated. The combination is complete after the mixture has been stirred for about one day. The solution is then rendered alkaline and the dyestuff is salted out, filtered off and dried. The dyestuff thus obtained having probably the following formula:

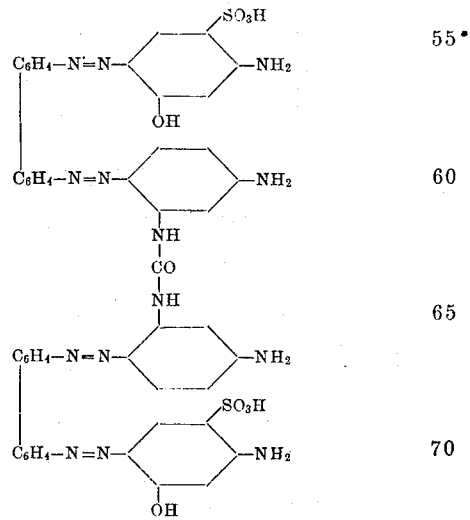

is after being dried and pulverized a dark brown powder which is soluble in water with a brown coloration and in concentrated sulfuric acid with a violet coloration; yielding upon reduction with stannous chlorid and hydrochloric acid benzidin, diaminophenol sulfonic acid, 1.2.4-triaminobenzene and carbonic acid. It dyes unmordanted cotton in orange shades which on being diazotized and combined with meta-phenylenediamin turn into a yellowish-brown of good fastness.

Instead of benzidin other para-diamins, instead of the meta-aminophenol sulfonic acid the meta-aminocresol sulfonic acid and instead of meta-diaminodiphenylurea meta-diaminoditolylurea can be used.

We claim:

1. The herein described new tetrakisazo dyestuffs, which are after being dried and pulverized dark powders yielding upon reduction with stannous chlorid and hydrochloric acid a diamin, triaminobenzene compounds, a diaminophenol sulfonic acid and carbonic acid: dyeing cotton generally orange shades which on being diazotized and combined with meta-phenylenediamin turn into yellowish-brown shades of good fastness, substantially as described.

2. The herein described new tetrakisazo dyestuffs, which is after being dried and pulverized a dark brown powder which is soluble in water with a brown coloration and in concentrated sulfuric acid with a violet coloration; yielding upon reduction with stannous chlorid and hydrochloric acid benzidin, diaminophenol sulfonic acid, 1.2.4-triaminobenzene and carbonic acid; dyeing cotton orange shades which on being diazotized and combined with meta-phenylenediamin turn into a yellowish-brown of good fastness, substantially as described.

In testimony whereof we have hereunto set our hands in the presence of two subscribing witnesses.

MYRTIL KAHN. [L. S.]
ANTON OSSENBECK. [L. S.]

Witnesses:
ALBERT NUFER,
HELEN NUFER.